United States Patent [19]
Erickson et al.

[11] Patent Number: 5,558,591
[45] Date of Patent: Sep. 24, 1996

[54] LUBRICATION DAM AND PLUG FOR A VEHICLE AUTOMATIC TRANSMISSION

[75] Inventors: Dennis C. Erickson; Paul R. Erickson, both of Tallahassee; Jimmy Arledge, Havana, all of Fla.

[73] Assignee: Superior Transmission Parts, Inc., Tallahassee, Fla.

[21] Appl. No.: 457,240

[22] Filed: Jun. 1, 1995

[51] Int. Cl.⁶ .................................................. F16H 57/04
[52] U.S. Cl. .......................... 475/159; 74/467; 74/606 R; 184/6.12
[58] Field of Search ................. 184/6.12, 6.27, 184/11.1, 13.1; 74/467, 606 R; 475/159

[56] References Cited

U.S. PATENT DOCUMENTS 4,378,711  4/1983  Daniel ........................................ 74/467
4,495,830  1/1985  Yasue et al. ................................ 74/467
4,736,809  4/1988  Kumazawa .............................. 180/75.1
4,736,819  4/1988  Muller ..................................... 184/6.12
4,930,601  6/1990  Leidecker et al. ...................... 184/6.12
5,038,631  8/1991  Renk et al. ................................ 74/467

FOREIGN PATENT DOCUMENTS

57-140963  8/1982  Japan ..................................... 74/606 R
5-33850    2/1993  Japan ..................................... 475/159
6-58381    3/1994  Japan ..................................... 475/159

Primary Examiner—Charles A. Marmor
Assistant Examiner—Nathan O. Jensen
Attorney, Agent, or Firm—Dowell & Dowell

[57] ABSTRACT

An expansible dam of a configuration to seal the spacing between a reverse clutch cylinder and casing of an automatic transmission/transaxle which cooperates with a plug of a size to seal the rear oil drain in the casing to the oil pan to thereby create a buildup of lubricating oil in the area of the planetary gears of the transmission.

18 Claims, 6 Drawing Sheets

Fig.1

PRIOR ART

Fig.2

PRIOR ART

Fig. 4

PRIOR ART

LUBRICATION DAM AND PLUG FOR A VEHICLE AUTOMATIC TRANSMISSION

BACKGROUND OF THE INVENTION

1. Field of the Invention

The present invention is directed to automatic transmissions/transaxles used on front wheel drive vehicles and more particularly, to a combination of a lubrication dam and plug for sealing an open space and rear drain opening provided in such transaxles to thereby create a buildup of lubricating oil in the area of the planetary gears and low-intermediate drum and sun gear assembly of the transaxle to thereby reduce metal wear of the planetary gears and allowing additional cooling of the metal components.

2. History of the Related Art

The present invention is particularly designed to alter the lubricating characteristics of automatic transaxles such as the Ford® Axod®, automatic transaxles of the type utilized on front wheel drive vehicles including the Ford Taurus®, Mercury Sable®, and Lincoln Continental® during 1986 through 1991 and the electronic version of the transaxle utilized from 1991 to present known as the Ford® Axod-E®. Both the Axod® and the Axod-E® have the same rear planetary gear arrangement. Lubricating oil is normally introduced into the area between the reverse clutch cylinder and the planet support of the final drive assembly of the transaxle through ports in the sun gear of the shell and gear assembly mounted forwardly of the reverse clutch cylinder. In such transmissions, space is provided between the transaxle casing and the reverse clutch cylinder through which oil may drain forwardly of the transaxle casing through an opening therein into the drain pan mounted beneath the casing. Also, a rear oil drain opening is provided in the casing adjacent the planetary gear assemblies.

It has been noted that excessive heat buildup is created in the planetary gears, causing a breakdown of the gear components, thereby requiring transaxle maintenance.

Applicants have determined, through various testing procedures, that the failure of the planetary gear assemblies can be prevented by increasing the amount of lubricating oil which is retained in the area between the reverse clutch cylinder and the rear planet support of the final drive assembly of the transaxle. In order to modify the lubricating characteristics of the transaxles, it is necessary to make modifications to the interior flow characteristics between the casing and the operating components of the transaxle so as to create a buildup of oil within the area of the transaxle in which the planetary gears may be immersed in an oil bath so as to ensure maximum lubrication of the gears before the oil is allowed to flow back around the rear clutch cylinder and into the oil pan of the transaxle.

In making the tests, it was determined that two modifications are required to the existing transaxle configurations. A first modification is provided to dam the spacing between the lower portion of the reverse clutch cylinder and the transaxle casing, thereby retaining the lubricating oil rearwardly of the reverse clutch cylinder until a substantial buildup of lubricating oil is achieved in the area in which the planetary gears are housed. In addition, the conventional rear drain opening in the casing to the oilpan in the area of the planetary gears must also be plugged so that an increased buildup of lubricating fluid within the area of the planetary gears is achieved.

SUMMARY OF THE INVENTION

This invention is directed to a lubricating dam which includes a body portion of a configuration to cooperatively seat between the bottom portion of the reverse clutch cylinder and transaxle casing of transaxles such as the Ford® Axod® and Axod-E® type, wherein the body portion at the dam includes a pair of spaced metal plates between which an expansible neoprene-type material is positioned. A pair of spaced tightening or compression elements are provided through the body portion of the dam for selectively compressing the intermediate neoprene-type material to thereby squeeze the material outwardly relative to the front and rear metallic plates so that the material seals against the lower inner wall of the casing and the lower portion of the reverse clutch cylinder.

In the preferred embodiment, the lubrication dam is designed to be temporarily suspended from a supply hump, which extends from the forward portion of the reverse cylinder where an apply tube connects with the cylinder, utilizing a plastic tie which is insertable through a pair of spaced openings in the body of the lubrication dam. The lubrication dam is designed to be suspended by the tie until the reverse cylinder is reseated within the casing of the transaxle after which the compression elements may be tightened to expand the neoprene to effect the necessary seal between the reverse clutch cylinder and the transaxle casing.

The invention further includes a generally rectangularly plug having a pair of spaced flanges which form an intermediate groove along the periphery of the plug. The plug is of a size to be seated within the rear drain slot of the transaxle. In a preferred embodiment, a separate retention spring is bolted to the casing in the area of the oil pan which engages the outside surface of the plug to prevent displacement of the plug caused by fluid pressure buildup within the casing of the transaxle.

It is the primary object of the present invention to modify the lubricating characteristics in the area of the planetary gear assemblies associated with transaxles of the type similar to the Ford® Axod® and Axod-E® transaxles by closing the spacing between the reverse clutch cylinder and the transaxle casing and by plugging the drain back slot between the area of the planetary assembles and the oil pan of such transaxles so as to create a buildup of oil within the area of the planetary assembles to ensure complete lubrication of the gears thereof during operation of the transaxle.

It is another object of the present invention to modify existing Ford® Axod® and Axod-E® type transaxles to provide for an increased buildup of lubricating oil in the area of the planetary gear assemblies mounted between the reverse clutch cylinder and the rear planetary support of the final drive assembly in order to effect increased heat dissipation of the gears during operation of the transaxle without adversely affecting the operating characteristic of the transaxle and without having to modify any structural component of the transaxle.

DESCRIPTION OF THE PREFERRED EMBODIMENT

Figure 1:
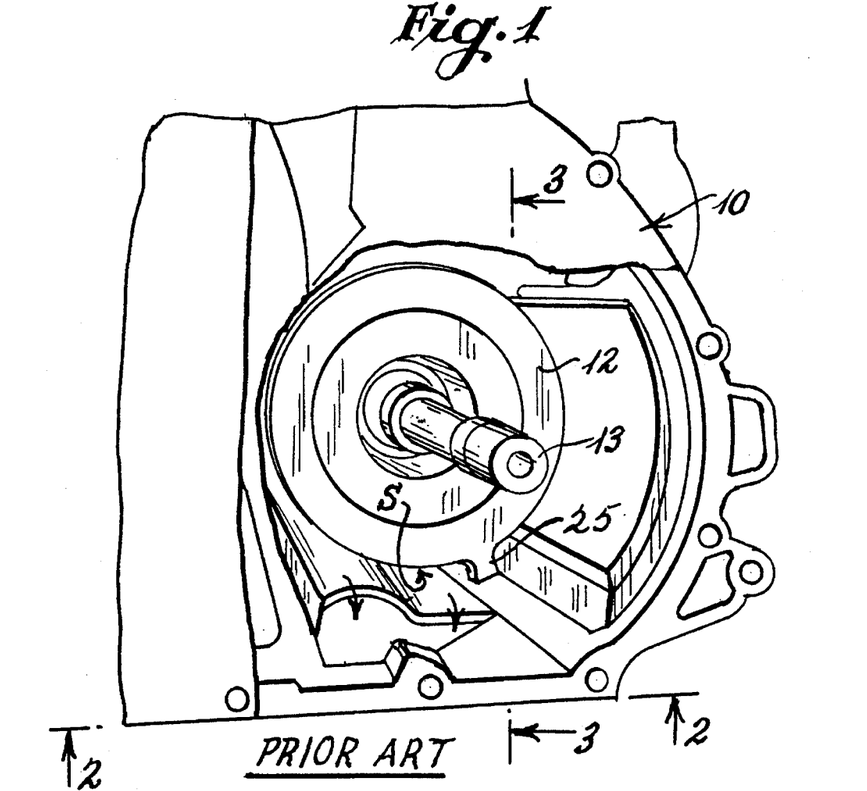
FIG. 1 is an illustrational cross-sectional view taken through a portion of a transmission or transaxle showing the outer casing and showing the reverse clutch cylinder mounted about a drive shaft showing a spacing at the lower portion of the cylinder and the inner wall of the casing through which oil normally flows as indicated by the arrows.
Figure 2:
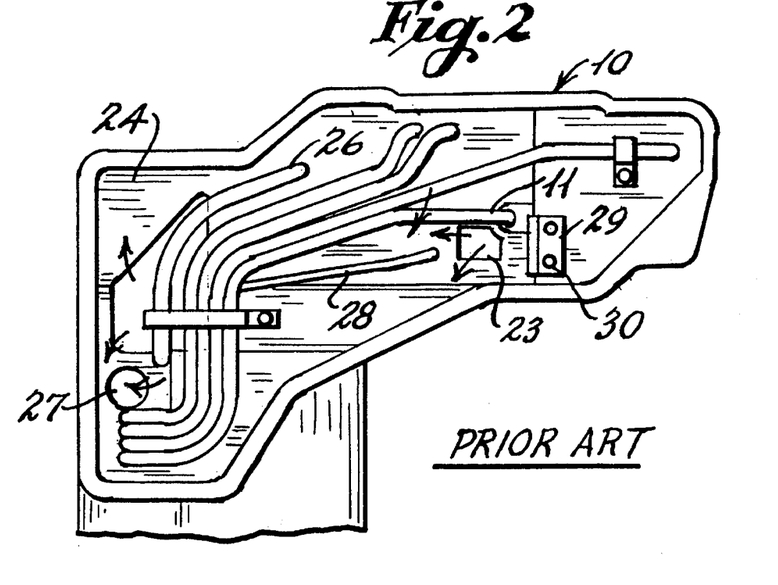
Fig. 2 is a bottom plan view taken along line 2—2 of FIG. 1 showing the rear drain opening or slot through which oil normally flows as indicated by the arrows in the drawing Figure.
Figure 3:
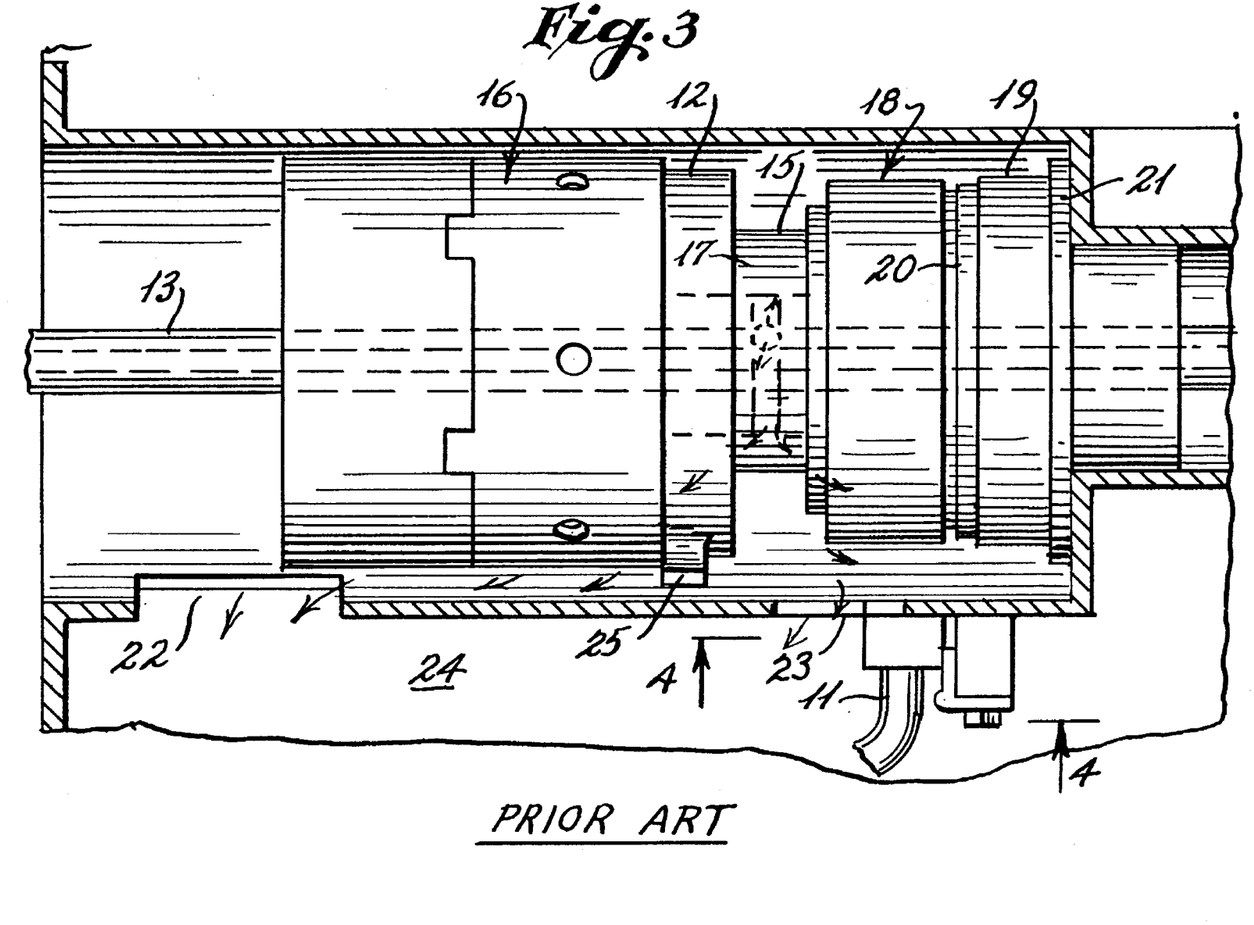
Fig. 3 is an enlarged partial cross-sectional view taken along line 3—3 of FIG. 1.
Figure 4:
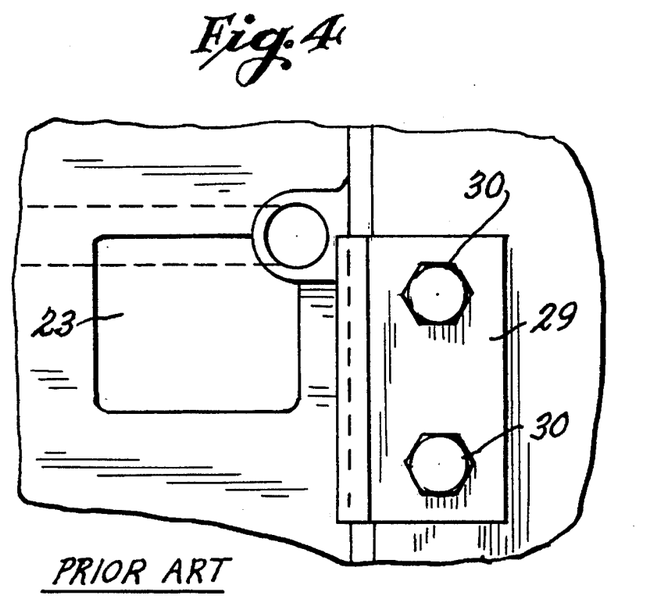
FIG. 4 is an enlarged partial bottom plan view showing the rear drain slot and its relationship with respect to a parking rod attachment-bracket mounted adjacent thereto.

With particular reference to FIGS. 1–3, a portion of the rear casing of a Ford® Axod® or Axod-E® transmission is disclosed at 10 in which a reverse clutch cylinder 12 is cooperatively seated about the drive shaft 13 of the transaxle. Mounted through and rearwardly of the reverse clutch cylinder is a sun gear 15 of a shell and sun gear assembly 16. The sun gear has a plurality of oil ports 17 therein from which oil is delivered to planetary gear assembly 18. Oil to the sun gear is supplied by way of a rear lube tube 11. Mounted rearwardly of the planetary gear assembly is a low intermediate drum and sun gear 20, a low intermediate band 19 and a rear planet support of the final drive assembly 21.

In the lower portion of the casing 10 is a forward drain back slot 22 through which a portion of the oil introduced through ports 17 normally flows to return to the oil pan 24 which is mounted in sealing relationship along the bottom of the casing. A rear drain back slot 23 is also provided in the area of the planetary gear assembly 18 through which the remaining oil introduced at 17 flows to the oil pan. The reverse clutch cylinder includes an outwardly extending hump 25 to which an apply tube 26 is normally connected.

An oil filter assembly, not shown, is normally mounted within the oil pan 24 in communication with opening 27. A parking rod 28 extends beneath the casing and in proximity to the drain back slot 23 and is retained at its outer end by a retention bracket 29 having a pair of mounting screws 30.

Under normal operation of the transaxle, lubricating oil is introduced into the area of the planetary gears 18 by way of the oil ports and the sun gear 15 of the shell and sun gear assembly 16. The oil is thrown outwardly and is utilized to lubricate the planet gears after which the oil drains through the rear drain back slot 23 to the pan or forwardly through the space "S" between the reverse clutch cylinder and the casing and through the forward drain slot 22 to the oil pan.

In order to build up lubricating fluid between the reverse clutch cylinder 12 and the rear planet support of the final drive assembly 21 so as to effectively completely lubricate the planetary assembly 18, a lubrication dam 40 is provided for sealing the space between the lower portion of the reverse clutch cylinder 12 and the inner wall of the casing 10. The lubrication dam is specifically shown in FIG. 7. In cooperation with the lubrication dam 40, the present invention also incorporates a dam plug 60 for sealing the drain back slot 22 in the casing 10. The dam plug 60 is specifically detailed in FIG. 5.

Figure 7:
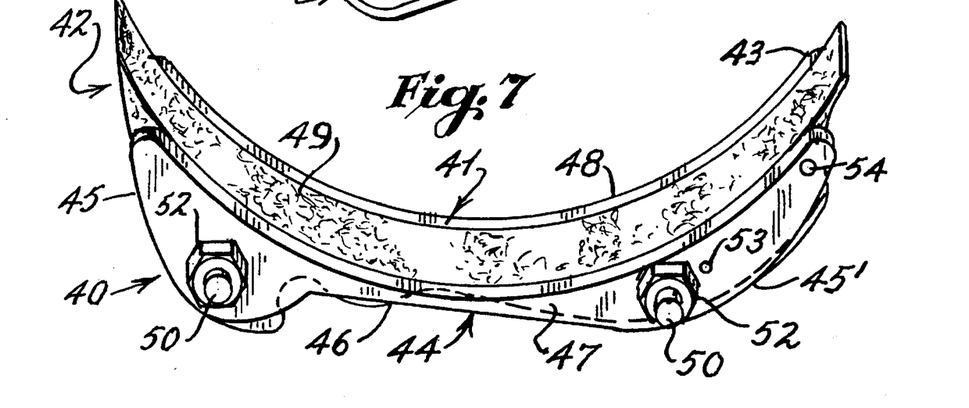
FIG. 7 is a perspective view of a lubrication dam used in accordance with the teachings of the present invention.

With specific reference to FIG. 7, the lubrication dam will be described in greater detail. The dam includes an upper concave portion 41 of a configuration to cooperatively engage the outer lower surface of the reverse clutch cylinder 12 and upwardly outwardly extending tapering end portions 42 and 43, respectively. The lower surface 44 of the lubrication dam includes outer somewhat convex or bulged segments 45 and 45' and an inwardly tapering central portion 46. The overall configuration of the lower wall follows the configuration of the inner surface of the outer casing 10 of the transaxle. The lubrication dam includes front and rear plates 47 and 48 which are preferably constructed of a carbon steel material and a central nitrile member 49 which may be neoprene. The front and rear plates are preferably approximately 0.10" in thickness and the neoprene material approximately 0.40" in thickness. A pair of spaced generally rectangular openings are made through the body of the lubrication dam adjacent each of the bulge sections 45 and 45' for receiving carriage bolts 50. The bolts extend through the lubrication dam 40 so that the outer ends of the bolts extend forwardly of the reverse clutch cylinder where lock nuts 52 are secured thereto. The lock nuts are used to compress the plates 47 and 48 relative to one another to thereby squeeze the nitrile material outwardly to effect a seal between the reverse clutch cylinder 12 and the casing 10 of the transaxle.

The concave configuration of the lubrication dam is preferably sufficient to extend upwardly along the lower ¼ to ⅓ of the lower periphery of the reverse clutch cylinder. This structure will create a buildup of lubricating oil behind the reverse clutch cylinder such that oil will flow normally back between the reverse clutch cylinder and the outer casing along the upper three-quarters to two-thirds of the peripheral area of the reverse clutch cylinder, as shown by arrows "A" in FIG. 10.

Figure 8:
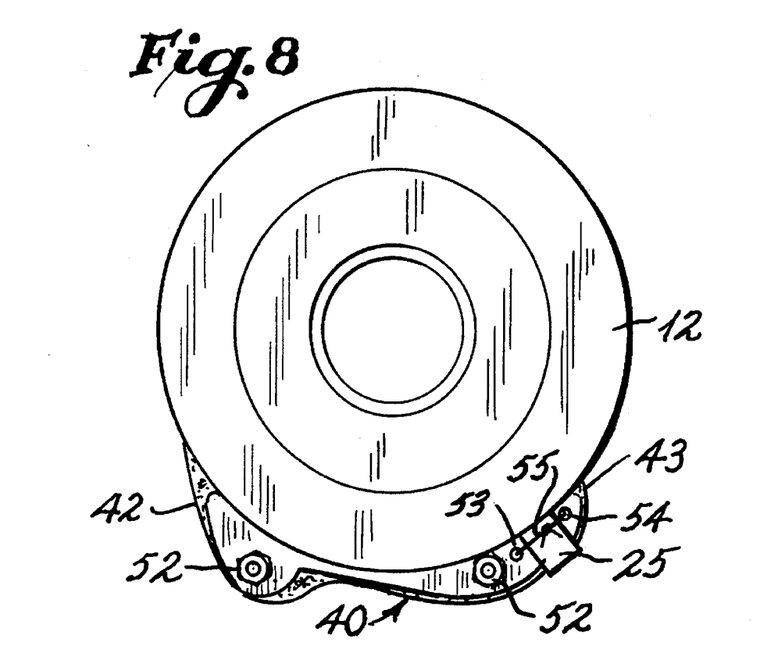
FIG. 8 is a front plan view of the reverse clutch cylinder of FIG. 1 showing the lubrication dam of FIG. 7 being suspended thereto.
Figure 9:
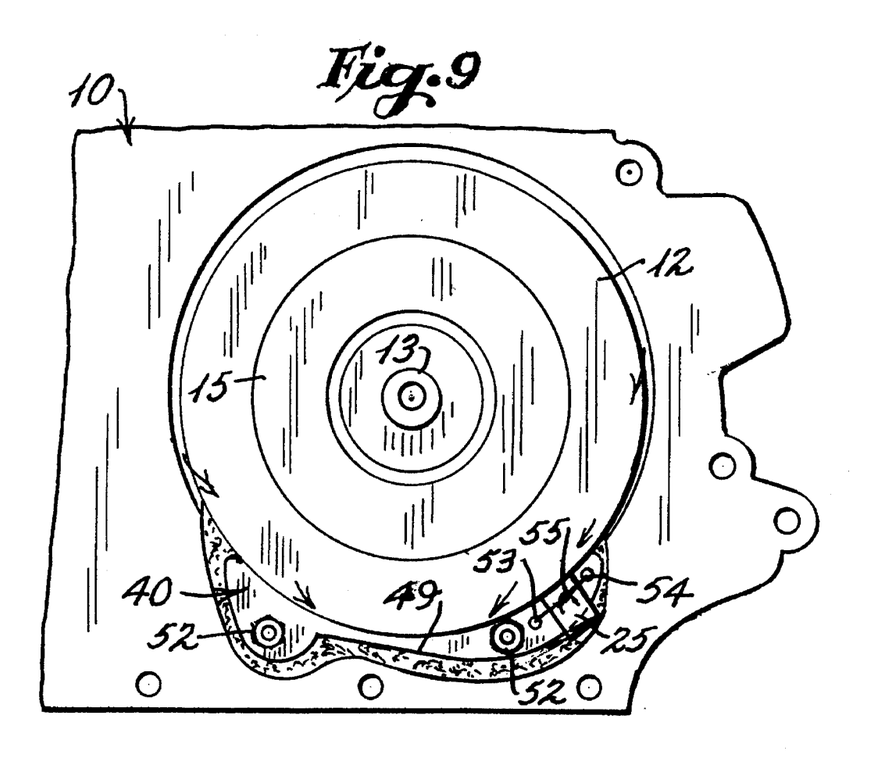
FIG. 9 is a front plan view of the reverse clutch cylinder of FIG. 1 showing the lubrication dam attached thereto after which a portion of the lubrication dam has been expanded in order to seal the area between the lower portion of the reverse clutch cylinder and the inner wall of the transaxle casing.

In order to install the lubrication dam between the reverse clutch cylinder and the outer casing, a pair of small openings 53 and 54 are made outwardly of the bolt 50 in the bulged area 45' of the dam. The openings 43 and 44 are spaced so as to be aligned on either side of the hump 25 which extends from the lower portion of the reverse clutch cylinder 12 to which the apply tube 26 is normally connected. A small plastic tie 55 is inserted through the openings 53 and 54 and twisted about the hump 25 to thereby support the lubrication dam to the reverse clutch cylinder, as shown in FIG. 8. Thereafter, the reverse clutch cylinder is slidingly engaged about the drive shaft and moved rearwardly into its proper seated position within the casing 10. During installation, the lubrication dam 40 may hang somewhat relative to the hump 25, however, once the reverse clutch cylinder is properly positioned within the casing, the lubrication dam is adjusted so as to properly seat within the spacing between the reverse clutch cylinder and the casing and rearwardly of the hump 25. Thereafter, the lock nuts 52 are tightened so as to squeeze the inner nitrile material 49 to effect a seal of the dam with respect to the reverse clutch cylinder and the casing. In those instances where the hump of the reverse clutch cylinder includes machining, such machining may have to be ground before the lubrication dam is secured thereto. Further, it is recommended that a transfluid such as TransGel® be applied to the outside edges of the dam prior to installation.

Prior to tightening the lubrication dam, an Allenhead wrench is utilized to torque the reverse drum anchor bolts (not shown) to approximately 8 to 9 foot pounds. The 19 mm lock nut associated with the anchor bolt should be tightened to approximately 25 to 35 foot pounds. Thereafter, the apply tube is reseated to the hump 25 applying necessary sealer about the tube. Thereafter, the lock nuts 52 are alternately tightened, causing the inner gasket nitrile material to extend outwardly to effect the necessary seal. Care should be taken not to overtighten the lock nuts 52.

Figures 5, 6:
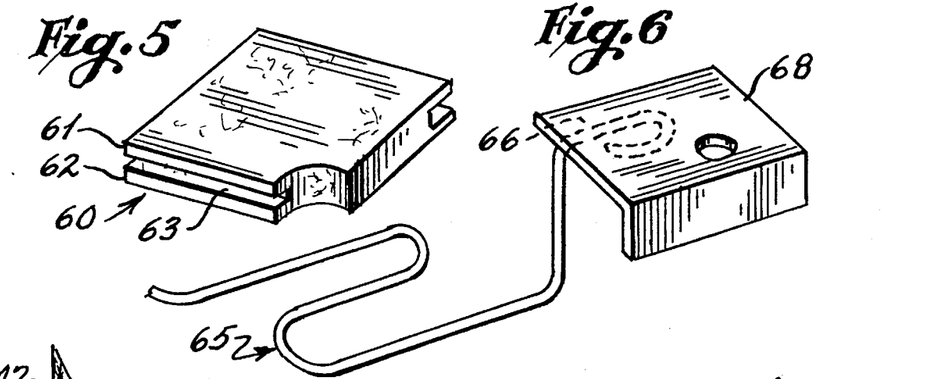
FIG. 5 is a perspective view of a plug for closing the rear drain slot shown in FIG. 4.
Fig 6 is a perspective view of a retention spring which is mounted in the area of the parking rod retention bracket in order to place force against the plug shown in FIG. 5 when the plug is installed within the rear drain slot shown in FIG. 4.

With specific reference to FIG. 5, the rear drain back slot plug 60 is shown in greater detail. The plug 60 is formed of a nitrile material. It is generally rectangular, having one corner cut away as shown in the drawing Figure. The plug is approximately 1.150" in width and approximately 1.60" in length. The cutout is approximately 0.4" in length and approximately 0.45" in width.

Figure 10:
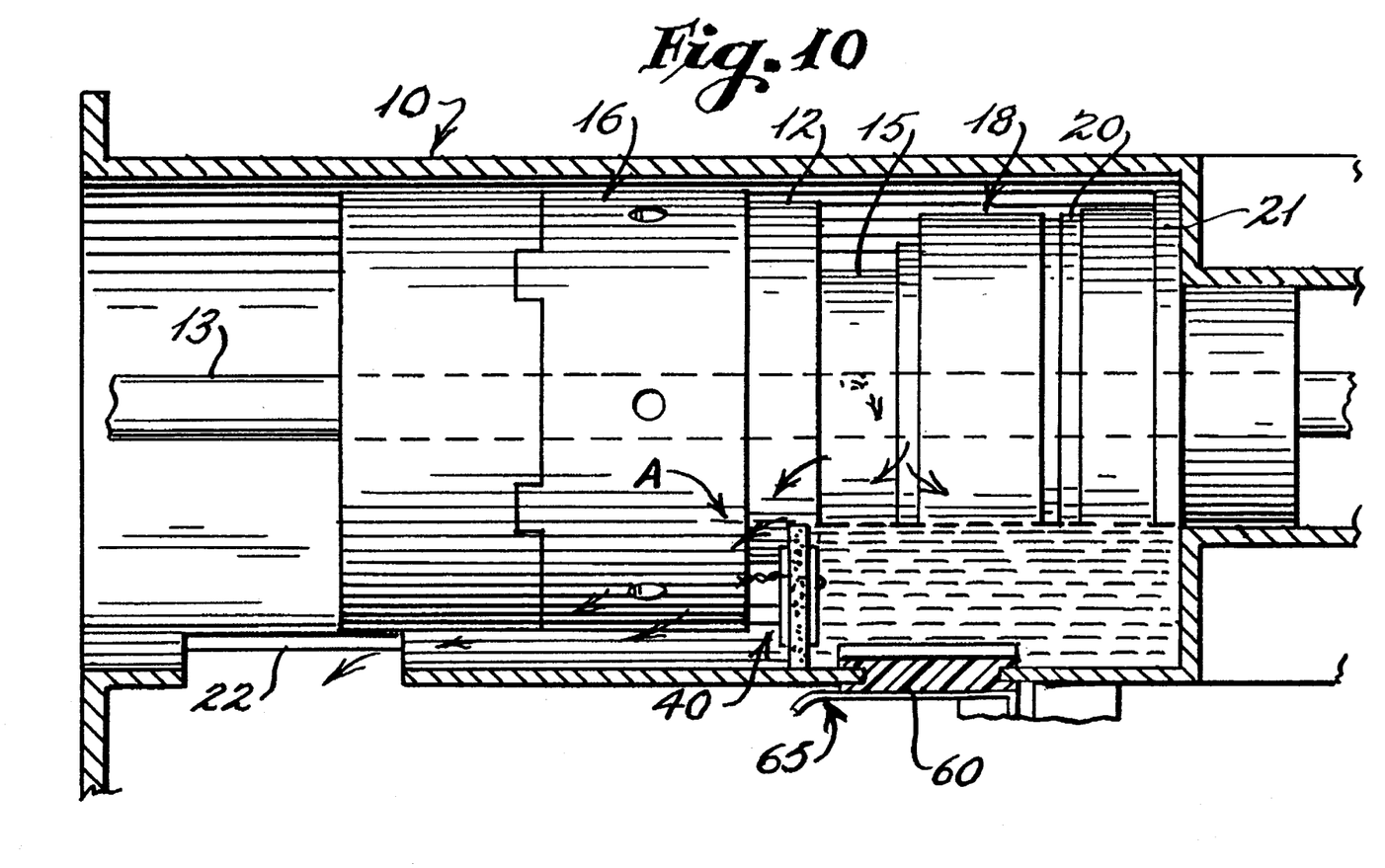
FIG. 10 is a partial cross-sectional view similiar to that of FIG. 3 but showing the oil flow pattern after the lubrication dam and plug of the present invention have been installed.
Figure 11:
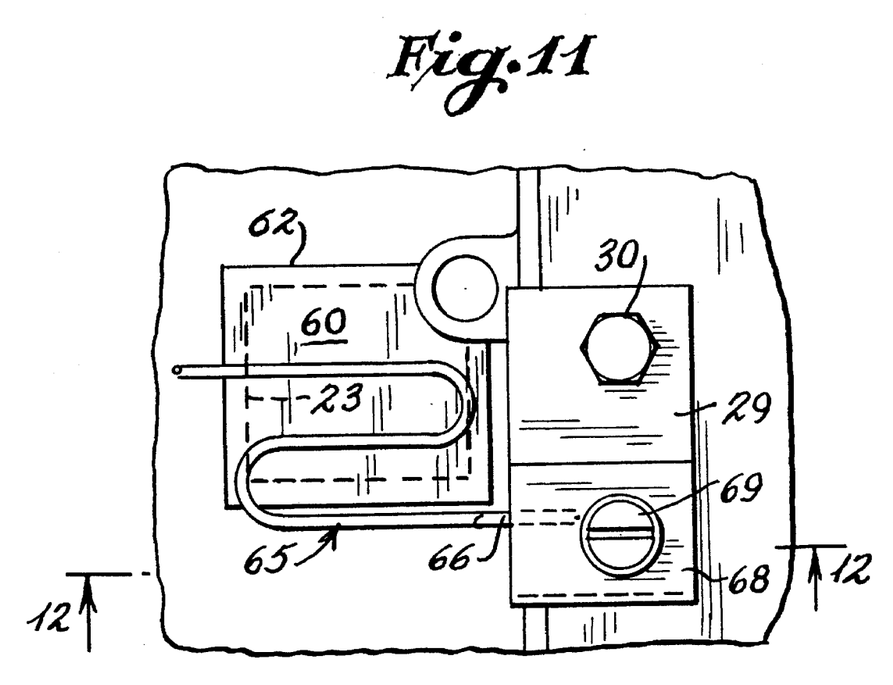
FIG. 11 is an enlarged bottom plan view showing the retention spring mounted in overlying engagement with the plug of FIG. 5 after the plug has been installed.
Figure 12:
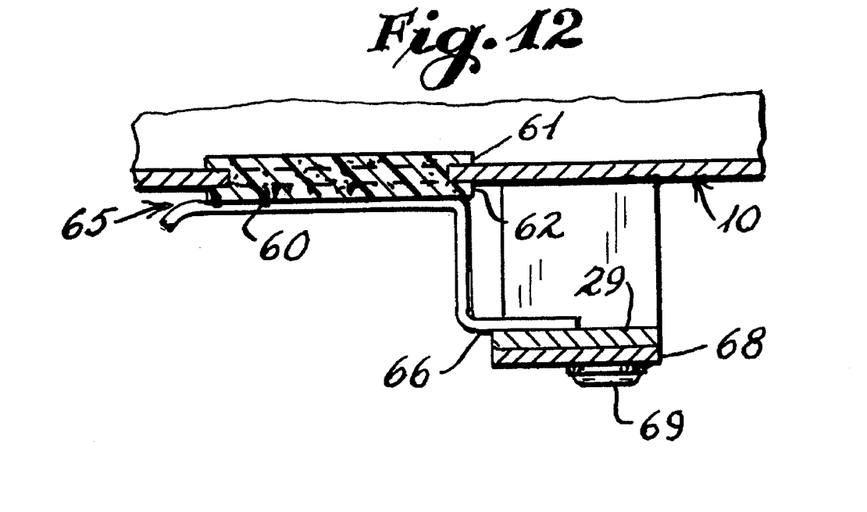
FIG. 12 is an enlarged cross-sectional view taken along lines 12—12 of FIG. 11.

The plug includes a pair of spaced flanges 61 and 62 which extend around the periphery thereof except within the cutout portion. The flange is defined by an inset groove 63 of approximately 0.15". The actual dimensions of the plug may be varied depending upon the size of the drain back slot in the transaxle casing. The plug is designed to be rotated into position so that the drain back slot is sealed with the flanges 61 and 62 positioned on the inner and outer portions of the casing, respectively, as shown in FIGS. 10–12..

In order to retain the plug 60 in the drain back slot 23, an elongated serpentined spring element 65 is provided having an attachment portion 66 which is designed to be seated beneath a retention clip 68. To mount the retention spring so that the spring engages the outer surface of the plug when it is seated within the rear drain back slot 23, one of the bolts 30 of the retention plate 29 for the parking rod is removed, thereafter, the retention spring clip 68 is aligned and secured to the retention clip 68 by a bolt 69. The end 66 of the retention spring mounted beneath the clip 68 is configured so as to apply a forceful pressure against the body of the spring toward the casing so that the spring holds the plug 60 against the casing after it is seated within the rear drain back slot 23.

With the lubrication dam 40 and plug 60 installed as previously discussed, approximately one quart of additional oil is retained within the area of the planet gears of the planetary assembly 18 during operation of the transaxle. During the operation of the modified transaxle, the planet gears are completely bathed in the oil retained and oil flow back to the pan is accomplished by the oil passing between the upper portion of the reverse clutch cylinder and the casing as shown by arrows "A" in FIG. 10. Tests have indicated that the life of the planet gears is significantly increased utilizing the teachings of the present invention as the gears are not only more adequately lubricated but are also cooled by the oil bath contained in the vicinity of the gears. No adverse effects have been noted with respect to the oil pump associated with the transaxle and oil pump pressure operates within a normal operating range as required by the manufacturer.

Although not forming part of the apparatus of the present invention, it may be beneficial in some instances to modify the oil separator plate positioned between the main control valve body and the casing of the transaxle through which oil is distributed to the various portions of the transaxle. The modification would be to increase the size of the rear lubrication intake and exhaust openings in the separator plate to approximately 0.078". In some transaxles, this modification would not be necessary.

The foregoing description of the preferred embodiment of the invention has been presented to illustrate the principles of the invention and not to limit the invention to the particular embodiment illustrated. It is intended that the scope of the invention be defined by all of the embodiments encompassed within the following claims and their equivalents.

What is claimed:

1. In an automatic transaxle for a front wheel drive automatic vehicle which includes a transaxle casing in which a drive shaft is mounted and wherein the drive shaft is connected through a reverse clutch cylinder to a planetary gear assembly mounted to a rear planet support assembly and wherein a spacing is created between the lower outer portion of the reverse clutch cylinder and the inner wall of the casing and a rear drain back slot is provided in the casing communicating the area in which the planetary gear assembly is housed within an oil pan, the improvement comprising, a lubrication dam means of a configuration to be seated between the lower portion of the reverse clutch cylinder and the inner wall of the casing, said lubrication dam means including outer surface portions for creating a seal between the lower portion of the reverse clutch cylinder and the transaxle casing, and a plug means, said plug means being of a size to substantially close the rear drain back slot in the transaxle casing, whereby said lubrication dam and said plug means will cause a buildup of lubricating fluid within the casing in the area of the planetary gear assembly.

2. The improvement of claim 1 including a retention spring means, means for mounting said retention spring means to an outer portion of said transaxle casing adjacent said plug means, said retention spring means being engagable with said plug means so to resist displacement of said plug means from said rear drain back slot.

3. The improvement of claim 1 in which said lubrication dam means includes a body portion having inner and outer plate members and a compressible intermediate material layer, adjusting means extending through said body portion, and means for adjusting said adjusting means for compressing said intermediate layer to bulge said intermediate layer against said lower portion of the reverse clutch cylinder and the transaxle casing.

4. The improvement of claim 3 in which said body portion of said lubrication dam includes a generally concave upper edge having outer tapered end portions and a lower generally convex edge portion having spaced bulged segments and an inwardly tapering central segment.

5. The improvement of claim 4 including at least two adjusting means extending through said body portion in spaced relationship to one another.

6. The improvement of claim 5 including a pair of spaced openings in one of said bulged segments of said body portion, and tie means extendable through said spaced openings for select suspending said body portion relative to a hump extension of reverse clutch cylinder.

7. The improvement of claim 6 in which said plug means includes a generally rectangular body portion having inner and outer extending flanges defining a groove therebetween, said flanges being of a size to extend outwardly from the rear drain back slot when said plug means is inserted within the slot.

8. The improvement of claim 7 including a retention spring means, means for mounting said retention spring means to an outer portion of said transaxle casing adjacent said plug means, said retention spring means being engagable with said plug means so as to resist displacement of said plug means from said rear drain back slot.

9. The improvement of claim 1 in which said plug means includes a generally rectangular body portion having inner and outer extending flanges defining a groove therebetween, said flanges being of a size to extend outwardly from the rear drain back slot when said plug means is inserted within the slot.

10. A combination lubrication dam and plug for use with an automatic transaxle for vehicles having front wheel drive where in the transaxle includes a casing in which a drive shaft extends through a reverse clutch cylinder to a planetary gear assembly mounted forwardly of a rear planet support and wherein a space is provided between a lower portion of the reverse clutch cylinder and the inner surface of the casing and a rear drain back slot is provided in the casing communicating the area adjacent to the planetary gear assembly with an oil drain pan secured to the outer surface of the casing, said combination comprising, a lubrication dam means having a body portion of a configuration to cooperatively seal the space between the lower portion of the reverse clutch cylinder and the inner surface of the casing and a plug means of a size and configuration to close the rear drain back slot in the transaxle casing.

11. The combination of claim 10 including a retention spring means, means for mounting said retention spring means to an outer portion of a transaxle casing adjacent said plug means, said retention spring means being engagable with said plug means so as to resist displacement of said plug means from a rear drain back slot.

12. The combination of claim 10 in which said lubrication dam means includes a body portion having inner and outer plate members and a compressible intermediate material layer, adjusting means extending through said body portion, and means for adjusting said adjusting means for compressing said intermediate layer to bulge said intermediate layer.

13. The combination of claim 12 in which said body portion of said lubrication dam means includes a generally concave upper edge having outer tapered end portions and a lower generally convex edge portion having spaced bulged segments and an inwardly tapering central segment.

14. The combination of claim 13 including at least two adjusting means extending through said body portion in spaced relationship to one another.

15. The combination of claim 14 including a pair of spaced openings in one of said bulged segments of said body portion, and tie means extendable through said spaced openings for selectively suspending said body portion relative to a hump extension of a reverse clutch cylinder.

16. The combination of claim 15 in which said plug means includes a generally rectangular body portion having inner and outer extending flanges defining a groove therebetween.

17. The combination of claim 16 including a retention spring means, means for mounting said retention spring means to an outer portion of a transaxle casing adjacent said plug means, said retention spring means being engagable with said plug means so as to resist displacement of said plug means from a rear drain back slot.

18. The improvement of claim 12 in which said plug means includes a generally rectangular body portion having inner and outer extending flanges defining a groove therebetween.

* * * * *